C. C. BUSSEY.
PROCESS OF TREATING CARBONACEOUS MATERIAL FOR THE RECOVERY OF THE VOLATILE
HYDROCARBON CONSTITUENTS THEREOF.
APPLICATION FILED APR. 10, 1918.

1,432,276.

Patented Oct. 17, 1922.
4 SHEETS—SHEET 1.

Patented Oct. 17, 1922.

1,432,276

UNITED STATES PATENT OFFICE.

CHARLES C. BUSSEY, OF BROOKLYN, NEW YORK, ASSIGNOR TO SAMUEL E. DARBY, TRUSTEE, OF NEW YORK, N. Y.

PROCESS OF TREATING CARBONACEOUS MATERIAL FOR THE RECOVERY OF THE VOLATILE HYDROCARBON CONSTITUENTS THEREOF.

Application filed April 10, 1918. Serial No. 227,673.

*To all whom it may concern:*

Be it known that I, CHARLES C. BUSSEY, a citizen of the United States, and resident of Brooklyn, county of Kings, State of New York, have made a certain new and useful Invention in Process of Treating Carbonaceous Material for the Recovery of the Volatile Hydrocarbon Constituents Thereof, of which the following is a specification.

This invention relates to the process of treating carbonaceous material for the recovery of the volatile hydrocarbon constituents thereof.

The object of the invention is to provide a simple, efficient, practical and economical process of treating carbonaceous material, such as coal, shale, lignite, or the like, for the recovery of the volatile hydrocarbon constituents thereof.

The invention consists substantially in the mode of operation hereinafter set forth and finally pointed out in the appended claims.

One of the difficulties heretofore experienced in commercial practice, in the treatment of carbonaceous material for the recovery of the hydrocarbon constituents thereof, is the inability to handle and operate that character, quality and grade of carbonaceous material which contains the higher volatiles because of the tendency of such material, while in the process of treatment, to bridge or agglomerate into a solid or solidified slag-like mass within the heating chamber in which the treatment is carried on. Such bridging or agglomeration prevents the effective passage of air or gas through the mass. Various expedients have been resorted to, in practice, in the attempt to overcome this objection. One proposed method contemplates the treatment of the carbonaceous material in comparatively small quantities and in thin layers. This method has not proved successful. Other expedients have also been attempted, in the effort to overcome or remove the difficulty, and to prevent or minimize the effect of the formation of such masses, but without substantial success so far as I am aware. Among the causes which contribute to the formation of such solid masses within the body of the material under treatment, particularly in the methods and apparatus most generally employed commercially, may be mentioned the fact that the carbonaceous material to be treated is ordinarily maintained in a stationary body during the recovery or extraction operation. When the material, while so maintained as a stationary mass, is subjected to the action of the extracting heat, such material agglomerates or solidifies or forms into a slag-like condition of hard solid material which bridges across the extraction chamber, prevents the effective passage of air or gas through the mass of material under treatment, and clogs and arrests the extraction action. This, in commercial practice, has proved to be a source of serious difficulty and has resulted in preventing the effective recovery of the volatiles from that class of carbonaceous material known as the "higher volatile" material, such for example, as cannel coal, and has prevented the use of such higher volatile material for extraction purposes.

For brevity of description I will hereinafter refer to the raw material to be treated as "coal", intending, however, to include thereby any suitable carbonaceous material such as coal, shale, lignite, or the like; and by "higher volatile" coal I desire to include coal of that quality and grade which contains, say, from forty-five per cent upwards of volatile hydrocarbons. I desire, however, to reserve a fair measure of latitude as to the lower limit of percentage of volatiles as this factor varies with different grades of coal ordinarily referred to as the "higher volatile" coal.

In commercial practice as heretofore most generally carried out the treatment of coal for the recovery and extraction of the volatile constituents thereof has been for the most part confined to the "lower volatile" class of coal, although many efforts have been made, and apparatus proposed, to effect commercially the recovery and extraction of the volatiles from coal of the higher volatile class, but without substantial commercial success.

Moreover, while it has long been sought to effect the treatment of coal for the recovery of the volatiles contained therein by the use of low temperatures, practical commercial success has not attended the efforts made in this direction, and the use of apparatus proposed therefor has not proved satisfactory, economical or efficient. In the practical commercial processes and apparatus very high temperatures have been heretofore ordinarily employed and required. These temperatures run usually around 2000° F., more or less. When the volatiles contained in carbonaceous material are subjected to such high temperatures chemical changes take place in the extracted volatiles or distillates resulting in the production of less valuable products, such as coal tar and other products, which differ chemically from the more valuable extracted products such as crude oil and derivatives therefrom. This is true even when the coal of the lower volatile class is employed. In other words, according to the methods heretofore used commercially, and which have been the most successful, high temperatures are employed in the extracting or distilling operation, resulting in the production of a larger percentage of coal tar and a correspondingly smaller percentage of the more valuable crude oil product and its derivatives.

Because of the high temperatures ordinarily required in the extraction operation, according to the methods heretofore most generally used in commercial practice, it has been found impractical to use large units capable of handling large quantities of coal; difficulties have resulted due to mechanical stresses and strains developed in the feeding and delivery devices employed and required for the material under treatment; the cost of construction, installation and upkeep has been very large; much valuable time has been consumed in shutting down the furnaces for repairs, for recharging and discharge; and expensive and complicated quenching devices frequently have been required for quenching the mass of discharged product due to the ignition thereof upon being exposed to the oxygen of the outer air.

For these and other practical reasons the units heretofore employed have been limited in size and capacity, and hence the daily quantity of material handled has been thereby materially prescribed and the output of recovered products limited, thereby enormously increasing the operating costs.

It is among the special purposes of my present invention to avoid these and other difficulties and to provide a process for treating carbonaceous material, whether of the higher volatile class or of the lower volatile class, for the extraction and recovery of the volatile constituents thereof, which is simple, practical, efficient and economical.

In carrying out my present invention I propose to employ maximum extracting temperatures of approximately 800° F. instead of the higher temperatures, 2000° F. more or less, heretofore found to be necessary in commercial practice.

I propose in accordance with my invention to employ the body of material to be treated as a source of heat by forming a fuel bed at the bottom of the mass of material and maintaining the bottom portion of such fuel bed in a state of combustion and causing the heated products of combustion from the lower portion of the fuel bed to be passed through the superposed fuel bed and the mass of material. I also propose to remove the residue of the fuel from the bottom of the fuel bed and at the same time supply material from the superposed fuel bed to take the place of the removed residue, and supply fresh raw material to the top of the pile of material superposed on the fuel bed. By suitably regulating and controlling the heat generation and the passage of the heated gases and vapors through the mass, the material is subjected, during its progression, to an increasing temperature from the point of its admission to the chamber where the treatment is carried out to the point where the maximum extracting heat is attained, at which point the extracting action is completed. The volatiles driven off from the mass of material under treatment at the various temperature zones are withdrawn together and subjected to the various stages of condensation and refinement required for the purpose of collecting and recovering the values. In other words I propose, in accordance with my invention, to form a fuel bed at the bottom or base of a stack or pile of material to be treated, forming such fuel bed out of the material itself after the extraction action thereon has been completed, which fuel bed supports and carries the weight of the superposed stack or pile of the material, the fuel residue being ejected or removed from the bottom of the fuel bed and coincidently fresh material being supplied from the top as the mass progresses through the various stages of treatment.

I also propose, in accordance with my invention, to carry on the extracting and recovery operation continuously, and, to this end, to withdraw the vapors as the volatiles are driven off from the material, and to maintain the mass of material under treatment in continuous progression, thereby preventing the formation of bridges or agglomerated or solidified masses within the body of material under treatment. I also propose, in accordance with my invention, to effect the extraction and recovery of the crude oil content of the coal instead of coal tar oils. That is to say, by effecting the extraction of volatiles at temperatures below the cracking temperatures of oil, the recovery of the volatiles of the coal is accomplished with the least possible chemical change therein through the heat to which they are subjected in the extraction and recovery operation.

I also propose in accordance with my invention to carry on the operation in such manner as to effect a large daily capacity per unit of the material handled, thereby vastly increasing the amount of extracted products obtainable per unit. I also propose to effect the extraction by means, the initial cost of construction and installation of which, its maintenance, upkeep and repair, are enormously reduced, and wherein a greatly increased percentage of the crude oil volatiles of the higher commercial values are recovered, even when employing the lower volatile coals, and wherein a higher volatile coal may be extracted with equal facility as in the case of lower volatile coal, a result which has not heretofore been successfully accomplished commercially.

I have found that I am enabled to accomplish my objects and purposes by subjecting all the material under treatment, at all points in any plane transverse or normal to the line of feed or progression thereof, to a uniform degree of temperature at any given instant of time; by subjecting all particles of the material in such a plane at any given instant of time to the same extent of extracting action; by subjecting all parts of the mass under treatment in the same plane at a given instant of time to a substantially uniform degree of pressure and of progression; by maintaining a substantially uniform degree of heat generation in the fuel bed employed at all points in any given transverse plane at any given instant of time; by effecting the removal of the fuel residue and coincidently therewith supplying fresh material; by efficiently controlling and maintaining uniformity of the heat at the various stages or zones of extracting action per unit of time; by maintaining a substantially constant maximum heat in the successive extracting zones through which the material by its progression is carried, thereby effecting a more rapid extraction action; by regulating the removal of fuel residue and the supply of fresh material according to the maximum temperature to which the extraction operation is carried on; and by the use of low temperatures with all the resultant advantages thereof.

In the accompanying drawings I have shown an illustrative arrangement of apparatus suitable for use in carrying my invention into practical operation.

Referring to the accompanying drawings:—

The same part is designated by the same reference numeral wherever the same appears throughout the several views.

Figure 1:
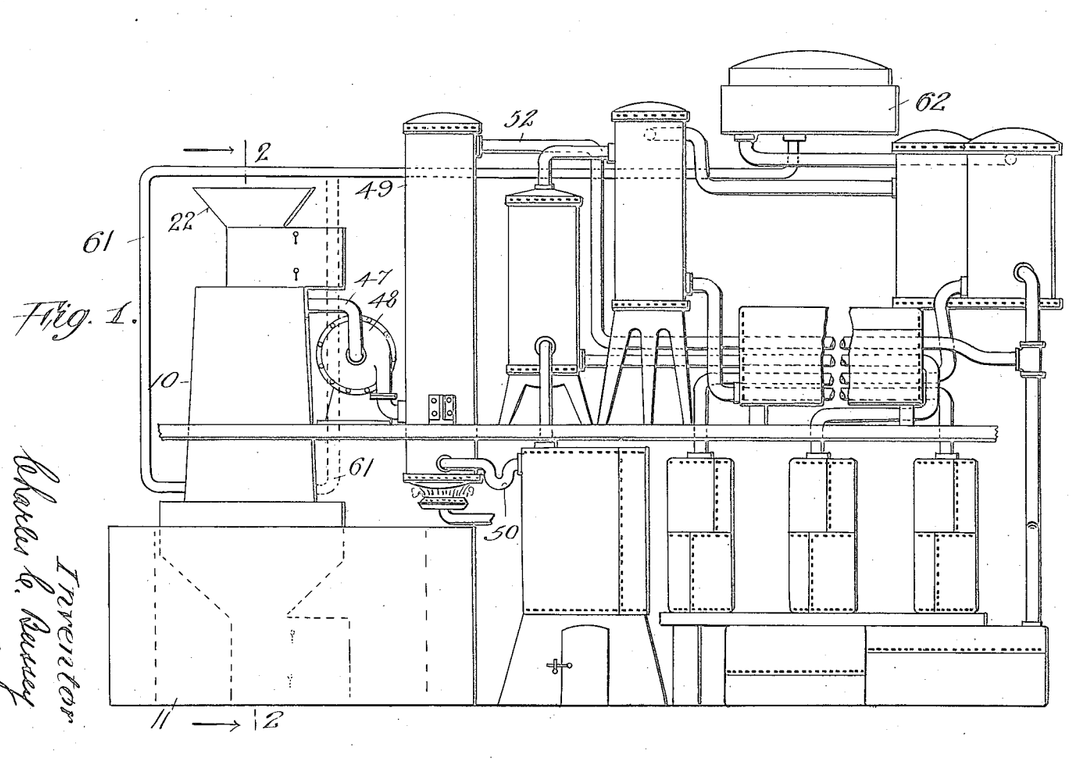
Fig. 1 is a view in side elevation, somewhat diagrammatic, illustrating a unit plant suitable for use in carrying out my invention.
Figures 2, 5, 6, 7:
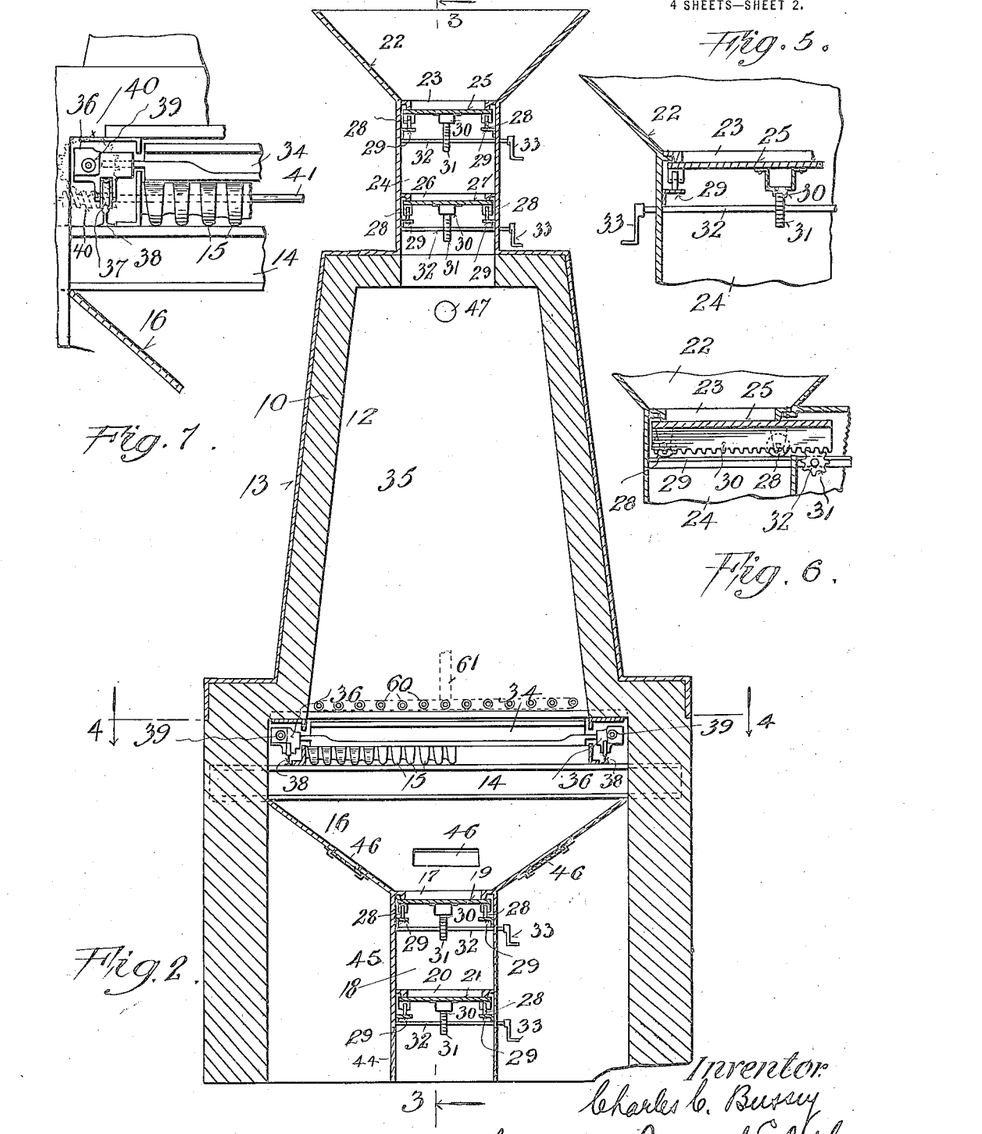
Fig. 2 is a view in vertical section on the line 2, 2, Figure 1, looking in the direction of the arrows.
Fig. 5 is a broken detail view in section on the same plane with Fig. 2, and on a somewhat larger scale, showing the construction of a feed or discharge control gate employed in connection with my invention.
Fig. 6 is a similar view taken in a plane at right angles to Fig. 5.
Fig. 7 is a view somewhat enlarged showing one end of the fuel residue discharge bar and its associated carriage.
Figures 3, 8, 9:
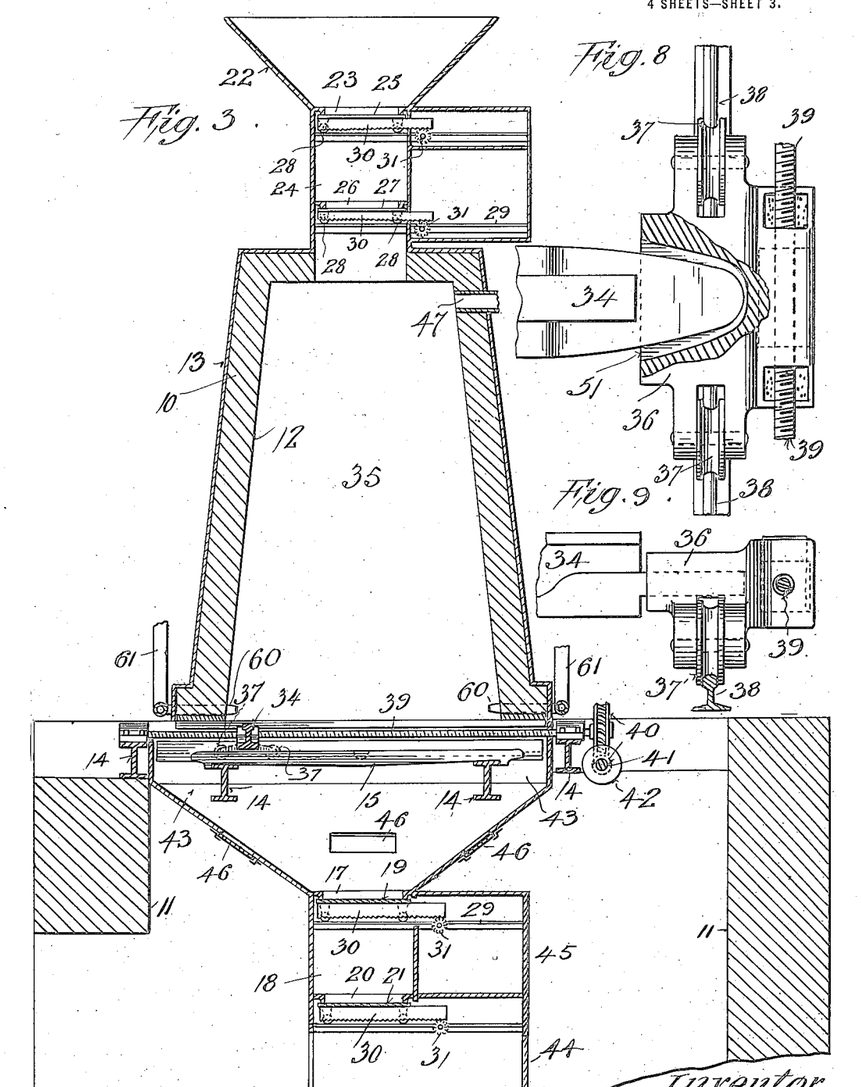
Fig. 3 is a similar view on the line 3, 3, Fig. 2, looking in the direction of the arrows.
Fig. 8 is an enlarged view in top plan, parts in section, parts broken, showing the connection of one end of the fuel residue ejector bar with its operating carriage.
Fig. 9 is a view in end elevation of the construction shown in Fig. 8.
Figure 4:
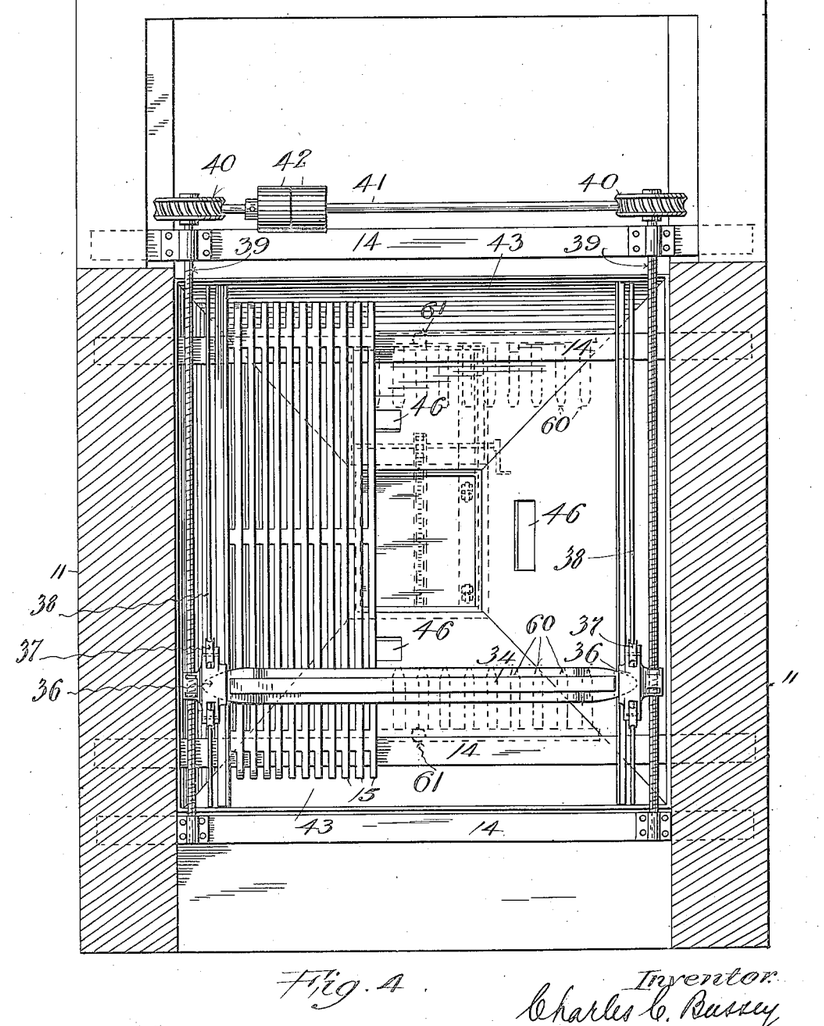
Fig. 4 is a view in horizontal section on the line 4, 4, Fig. 2, looking in the direction of the arrows.

In the drawing I have shown a retort 10 carried by a suitable base 11, both of which may be made of any suitable material and of the required dimensions. The inner walls 12 of the retort or chamber are preferably inclined or tapered from the top or a point adjacent to the top downwardly so as to provide a chamber of gradually increasing interior areas, thereby providing not only for the efficient distribution and progression of the coal to be treated without clogging, but also permitting the proper expansion of the coal during the treatment.

In practice I have found that a retort and base composed of brick well answers the purpose, and for commercial operation the use of fire brick, particularly adjacent the base of the retort may be desirable. If desired, and as shown, the retort may be enclosed within sheet metal plates 13. Suitably built into or otherwise applied to the base 11 are beams 14 which extend across and beneath the base portion of the retort 10. Suitably supported upon a pair of these structure beams 14 are grate bars 15. These grate bars are constructed to rest upon and be carried by the structure beams 14, and in suitably spaced relation with respect to each other, and constitute the base support for the fuel bed when the process of my invention is being carried out. Immediately below the fuel supporting grate bars is a hopper 16 having downwardly converging sides which terminate in a central opening 17, which communicates with a discharging chamber 18 beneath said hopper 16. The communication between the hopper and the discharge chamber through the opening 17 is controlled in any suitable manner, as for example, by means of a sliding gate 19. The delivery from the discharging chamber is effected through an opening 20 in the bottom thereof which is controlled by a sliding gate 21.

Supported above the retort 10 is a receiving hopper 22 into which the coal to be treated is received. This hopper communicates through an opening 23 in its bottom with a receiving chamber 24, said communication being controlled in any suitable manner, as for example, by a sliding gate 25. The receiving chamber 24 delivers into the upper end of the retort 10 through an opening 26 in the bottom of said receiving chamber 24, which is controlled in any suitable manner, as for example, by a sliding gate 27.

The several gates 19, 21, 25, 27, may be operated in any convenient manner. I have shown a simple arrangement wherein these several gates are of like construction, and therefore a description of one will apply to all. Each gate is supported upon rollers 28 operating upon supporting tracks 29 carried by the inner side walls of the casing of chambers 18, 24, respectively. Attached to each gate is a rack bar 30 designed to be engaged by a pinion 31 by means of which the gate may be shifted into position to cover or to uncover the communication which it controls. The pinions 31 may be operated in any suitable or convenient manner. As illustrative of one arrangement I have shown each pinion mounted upon a shaft 32 which is journaled in the side walls of the chambers, to which shafts rotations may be imparted by any convenient means, such as cranks 33, although in practice the operation of the gates may be accomplished automatically.

In order to remove the fuel residue I employ an ejector bar 34, which, in the particular form shown, comprises an I-beam and is disposed to extend through and to have its ends project beyond the working area of the extraction chamber 35 of the retort. This ejector bar is supported at its ends in carriages 36 having rollers 37 arranged to operate along tracks or rails 38 supported upon the structure beams 14. The ejector bar 34 is disposed to operate immediately above and over the grate bars 15, and preferably, said ejector bar is disposed transversely to said grate bars to move laterally back and forth over the upper surfaces in the direction of the lengths of said grate bars. Any suitable or convenient means may be employed to effect the back and forth movements of the ejector bar 34. In the particular form shown, to which, of course, the invention is not to be limited or restricted, feed screws 39 are arranged to engage screw blocks in the carriages 36. The screws 39 at the opposite ends of the ejector bar are geared as at 40 to a drive shaft 41 which in turn is driven from any suitable or convenient source of power, as for example, through pulleys 42.

The ends of the grate bars extend somewhat beyond the interior area of the retort or extraction chamber 35 but terminate short of the interior area of the hopper 16 leaving spaces 43 between the ends of the grate bars and the side walls of the hopper 16. The ejector bar 34 is traversed, in the action thereof, sufficiently far to clear the ends of the grate bars, or at least sufficiently far to eject the lowermost portions of fuel residue over the ends of the grate bars to permit or cause such residue to fall through the spaces 43 and into the hopper 16 beneath. The traverse back and forth of the ejector bar 34 may be timed to suit the character of the coal under treatment, or the character of the treatment to which the coal is subjected. By this arrangement and with an ejector bar traversing back and forth rectilinearly across the lower end of the retort or extraction chamber 35 I avoid one of the serious objections heretofore experienced, particularly where an endless traveling belt is employed, namely, of crowding or pressing the superposed coal or fuel continuously in the direction of movement of the traveling belt, thereby causing variation in the density of the fuel bed or superposed material in horizontal planes through the mass of material, and which variations in density of the mass result in inequalities in the fuel bed as well as in the heat generated and in the extraction action to which the mass of material is subjected. By traversing the ejector bar back and forth across the lower end of the retort or extraction chamber 35 I am enabled to maintain a substantially uniform condition throughout the mass of fuel bed not only as to the degree of compression or density thereof but also as to the heat generation effected therein, and hence I am enabled to maintain substantially uniform conditions of extraction action throughout all points in any given plane through the mass of material parallel to the plane of action of the ejector bar, at any given instant of time, not only as to the degree of heat generated and extracting action of the heated products and vapors, but also as to the progression of the mass of materials throughout the entire process. It is to be understood that as the fuel residue is ejected by the action of the ejector bar 34 at the lower portion of the fuel bed corresponding fresh quantities of fuel material are admitted to the fuel bed and to the stack or pile under treatment at the upper end of the retort or extraction chamber. To efficiently accomplish this result the fresh material to be treated is delivered from the receiving hopper 22 with the gate 25 open and the gate 27 closed so that the chamber 24 is filled. The gate 25 is then closed and the gate 27 opened. The mass of material contained in the chamber 24 rests upon or forms in effect, the upper end of the stack or pile of material contained in the chamber 35. At the same time the gate 19 of the discharge hopper is opened and the gate 21 is maintained closed. As the action of the ejector bar 34 proceeds the fuel residue is continuously ejected, first over the ends of the grate bars 15 at one side of the fuel bed, and then over the opposite ends of the grate bars at the other side of the fuel bed. The fuel residue is collected in the hopper 16 and passes therefrom through the opening 17 into the discharge chamber 18, the pile or stack of material in the chamber 35 being maintained in uniform volume by the replenishment thereof from the chamber 24 of fresh material as the fuel residue is ejected at the bottom of the pile or stack and to the extent to which the fuel residue is ejected. The fuel bed is likewise and coincidentally replenished at the top from the coal in which the extraction action has been completed. When the discharge chamber 18 has become filled the gate 19 is closed and the gate 21 is opened so as to permit the fuel residue which has collected in chamber 18 to discharge through the opening 20 from the discharge chamber 18, into any suitable car or other receptacle placed beneath the chamber 18 to receive the same, and thence withdrawn through the doorway or opening 44 in the casing 45 within which the gates 19, 21, are arranged.

In like manner when the receiving chamber 24 has become exhausted by the supply of the contents thereof to the mass of material under treatment in the retort or chamber 35 the gate 27 is closed and the gate 25 opened so as to permit the receiving chamber 24 to be again filled from the hopper 22. Thus it will be seen that by suitably controlling the fuel hopper and discharge hopper gates the feed of the material to, through and from the retort or extraction chamber 35 is maintained substantially constant and the progression of the mass of material under treatment is uniform at all points, all particles of the material in any given plane normal to the direction of progression of the material and parallel to the plane of action of the ejector bar being subjected not only to the same degree of progression at any given instant of time but to uniform heat conditions and uniform extraction action.

It will be understood, of course, that at each traverse of the fuel residue ejector bar the portion of the fuel bed which rests upon the grate bars is ejected, the superincumbent fuel bed descending by gravity to take the place of the ejected portion, and the mass of material resting on the fuel bed likewise descending in corresponding amount into the upper part of the fuel bed. This action will necessarily lower the temperature not only of the fuel bed but also throughout the entire retort chamber. This lowering of the temperature is comparatively slight, however, and of short and controllable duration since the fuel bed immediately builds up in temperature, the draught therethrough being suitably controlled, until the desired maximum for extraction is again attained when the ejector bar is again actuated in the opposite direction to effect another removal of fuel residue. In this manner substantially uniform maximum extraction temperatures as well as substantially uniform speed of progression of the material and of extraction action are attained and maintained.

It is an important feature of my invention that with such a condition of substantially continuous feed of raw material and ejection of fuel residue due to the removal of successive increments from the bottom of the fuel bed and the replenishments, as above described, and with substantially uniform conditions of heat generation, of extraction and of progression of the material through the retort or extraction chamber as above explained, I am enabled to maintain a low maximum extracting temperature, for example, not to exceed approximately 800° F., which is below the cracking temperature of the oil product of extraction. This maximum extracting temperature is maintained at, or in the region of, the plane where the mass of material to be treated rests upon or merges into the fuel bed. At this point the extraction action has been practically completed, and the volatiles driven off and collected. That is to say, the volatiles begin to be released from the material at the upper portion of the mass where the temperature is quite low, and the extraction action continues under conditions of increasing temperature and pressure due to the increasing weight of the superimposed material, as the material progresses through the chamber, until the point of maximum extracting temperature is reached, and this maximum extracting temperature which, as above stated, is about 800° F., is attained when the extraction action is completed and the material passes into the fuel bed zone. Consequently I am enabled to effect the extraction and recovery of the oil content of the material under treatment without effecting the chemical change in such products of extraction resulting from the use of high or oil cracking temperatures, and hence the products of recovery, according to my process, are more nearly of the nature of oil products rather than of tar products. I am thus also enabled to extract and recover an oil product which carries higher percentages of the more volatile constituents of the material to be treated, and which would be chemically changed by the higher temperatures ordinarily employed, and therefore which in former practice, are recovered, if at all, only in comparatively small volumes, in the subsequent refining processes to which the oil and other extraction products may be subjected.

The ends of the ejector bar 34 extend into somewhat enlarged cup-shaped recesses 51 in the carriages 36. This feature of structure permits the ejector bar to be easily inserted or removed for replacement or repair, in case of breakage or accident, without jamming or choking the operation.

It is desirable, of course, to control the supply of air to the fuel bed according to the nature, quality or grade of material to be treated, the nature of the extraction action, the desired maximum temperature to be maintained, and the speed or timing of operation, in carrying out my invention. To accomplish this I propose to provide suitably controlled air openings indicated at 46 at convenient points below the fuel bed.

A delivery pipe connection 47 extends into the retort or extraction chamber 35 at its upper end. A suitable suction pump 48 is connected to the pipe 47 and delivers into an initial condensing chamber 49 from which the vapor and condensed products may pass through pipes 52, 50, respectively, into and through the various refining and treating apparatus for further treatment and refining, as may be desired, and which form no part of my present invention. By suitably regulating the suction action of the pump 48, and the area of opening of the air ports 46, any desired degree of draught may be maintained through the bed of material depending upon the nature or quality of the material under treatment, speed of operation desired, heat generation required, and extraction action.

In order to start up the apparatus initially a fire is ignited on the grate bars 15 and the material to be treated is then introduced through the feed hopper 22 chamber 24 and into the chamber 35 so as to fill the latter. The blower or pump 48 is put in operation and the air ports 46 regulated so as to cause the lowermost portion of the stack or pile of material contained in the chamber 35 to develop into a fuel bed. The heated products from the fuel bed are passed upwardly through the mass of material contained in the chamber 35 and eventually are drawn off along with the volatiles expelled thereby from the body of material lying above the fuel bed, through the delivery pipe connection 47 and pump 48 into the initial condensing tank or other desired receiving receptacle. In practice I have found it is desirable in this manner to build up a fuel bed approximately four feet in depth for efficient commercial operation. I propose, in accordance with my invention to maintain a substantially constant temperature not to exceed 800° F. at the upper surface of the fuel bed as above explained. As the fuel bed attains the stage of fuel residue at the bottom of the bed the ejector bar 34 is put into operation and the lowermost portions of the fuel bed are successively expelled or ejected, first by the movement of the ejector bar in one direction, and then by the movement of said bar in the other direction, the spent fuel or fuel residue being ejected ultimately over the respective ends of the grate bars and collected and removed as above described. The fused mass constituting the residue of the fuel bed is subjected during this operation not only to the pressure of the weight of the superincumbent material but also to that of the pressure bar in its ejecting movement. This results in the production of a solidified residue or coke product of excellent commercial value in the case of such raw material as cannel coal. As the successive portions of the fuel bed are thus ejected their places are taken by successive portions of fresh fuel by the descent by gravity of the mass of material lying above the plane of action of the ejector bar. The material thus progresses through the fuel bed in the same degree and at the same rate of progression throughout the entire mass of material under treatment, and the supply of fresh material at the top of the stack or pile is controlled accordingly. The material thus progressing or advancing substantially continuously through the retort or extraction chamber is subjected to increasing degrees of heat, starting with the lowest temperatures at the upper end of the stack or pile of material and increasing therefrom until the desired maximum of extraction temperature is obtained when the material reaches the stage where it passes into the fuel bed. During this action all of the volatiles are driven off from the coal. The maximum extracting temperature, as above stated, being below the cracking temperatures for oil, that is, not exceeding, for example about 800° F. in the case of coals of the class of higher volatiles, the extracted products are of the nature of oils instead of tar.

I have found that not only are the extraction products accomplished by the practice of my process of the nature of oil products rather than tar products, but also that because of the low temperatures employed, and other reasons, including the pressure due to the weight of the material and to the ejecting action of the ejector bar, the carbon gases are not exhausted from the fuel residue, with the result that such residue, particularly in the case of coals of the higher volatile class, forms a valuable coke product, which is of greater heat value than the ordinary gas house coke. This is an especially important feature of my invention in that I am not only enabled to accomplish commercially, practically and successfully the extraction of the oil contents of coal of the higher volatile class, such for example, as commercial cannel coal, but I am enabled to produce from such treatment of this class of coals a coke product which possesses a higher fuel value than that of the commercial coke produced in methods at present employed in commercial practice.

It will be observed that the heat required in carrying out my process is generated from and within the body of the material itself which is under treatment. I am therefore enabled to avoid the great expense and heat losses due to the use of outside sources of heat in carrying out the extraction operation. Where an outside source of heat is employed, and where extraction temperatures are required to be high, and are attained by conduction through the walls of the chamber in which the extraction is accomplished not only is there an enormous loss of heat sustained, which renders the extraction expensive, but there is failure to attain uniformity in the extraction temperatures throughout the entire mass of material being treated in the various extracting zones. These are practical difficulties encountered in many of the commercial plants at present in use and which my invention avoids.

By the practice of my invention I am enabled to effect a satisfactory extraction and recovery of the higher volatile constituents of carbonaceous material and I have found my process particularly effective in recovering such higher volatile products as toluol, benzol, and the like, which are extracted or driven off from the fuel and delivered into the initial condenser along with the other volatiles, gases and vapors, and from which condenser the various gases, oils and other products may be treated and refined according to any suitable, convenient or preferred well known refining operations for the recovery and commercial utilization of such gases, toluol, benzol, oil and other products.

It may sometimes be desirable to supplement the action of the fuel bed in generating the required extracting heat, and, in the case of some varieties of carbonaceous materials, such as shale, lignite, peat, and the like, to form and maintain the fuel bed within the body of the material under treatment without effecting combustion of the material itself. In such events I propose to employ suitable gas jets 60, disposed within the base of the retort chamber at a plane immediately above the plane of action of the upper surface of the ejector bar 34, and preferably in close proximity to the inner wall of the extraction chamber. As many gas jets may be provided as required by the nature of the particular carbonaceous material employed. The heating gas may be supplied from any desired source. In practice, however, the gases given off during the extraction operation furnishes an immediate available source of supply of the heating gas. In this event the gas is conducted through suitable piping 61 from the gasometer 62, into which the evolved gases are eventually collected from the extracting operation. In this manner my invention is carried out even where the material to be treated is of such character that it does not ignite or furnish the required extracting heat directly in and by its own combustion.

While I have shown and described a specific structure of apparatus suitable for use in carrying out my invention, it is to be understood that my process may be carried out in a wide variety of specifically different structures of apparatus. I do not claim herein therefore any structure or apparatus, nor that disclosed, as the novel subject matter of the apparatus shown and described is covered in a companion application filed on even date herewith.

What I do claim as new and useful and of my own invention and desire to secure by Letters Patent of the United States is:—

1. The process of treating carbonaceous material for the recovery of the volatile hydrocarbon constitutents thereof, which consists in maintaining the material to be treated in a vertical column or pile of increasing lateral dimensions towards the base of the column or pile, igniting the base portion of the pile or column of material and maintaining the mass at a point above the ignited portion at a temperature below the cracking temperature of oil, periodically removing the lowermost portions of the ignited mass in successive layers thereof, and coincidently supplying corresponding quantities of fresh material at the top of the pile or column, and passing the evolved heated vapors and other gaseous products upwardly through and removing the same at the upper end of the pile or column.

2. The process of treating carbonaceous material for the recovery of the volatile hydrocarbon constituents thereof, which consists in maintaining the material to be treated in a vertical column or pile of increasing lateral dimensions towards the base of the column or pile, igniting the base portion of the pile or column of material, and maintaining the mass at a point above the ignited portion at a temperature below the cracking temperature of oil, periodically removing alternately in opposite directions the lowermost portions of the ignited mass in successive layers thereof, and coincidently supplying corresponding quantities of fresh material at the top of the pile or column, and passing the evolved heated vapors and other gaseous products upwardly through and removing the same at the upper end of the pile or column.

3. The process of treating carbonaceous material for the recovery of the volatile hydrocarbon constituents thereof, which consists in maintaining the material to be treated in a vertical column, igniting the base portion of the pile or column of material to form a fuel bed in such base portion, passing the heated vapors and other gaseous products upwardly through and removing the same at the upper end of the pile or column, and periodically removing the lowermost portion of the fuel bed in successive layers thereof, and coincidently supplying fresh material at the top of the pile or column, thereby maintaining substantially uniform conditions of density, feed and temperature in the mass of material in any given transverse plane.

4. The process of treating carbonaceous material for the recovery of the volatile hydrocarbon constituents thereof, which consists in maintaining the material to be treated in a vertical column, igniting the base portion of the pile or column of material to form a fuel bed in such base portion, passing the heated vapors and other gaseous products upwardly through and removing the same at the upper end of the pile or column, and periodically removing the lowermost portion of the fuel bed in successive layers thereof in opposite directions, and coincidently supplying fresh material at the top of the pile or column, thereby maintaining substantially uniform conditions of density, feed and temperature in the mass of material in any given transverse plane.

5. The process of treating carbonaceous material for the recovery of the volatile hydrocarbon constituents thereof, which consists in maintaining the material to be treated in a vertical column, igniting the base portion of the pile or column of material to form a fuel bed in such base portion maintaining an extracting temperature below the cracking point of oil in the mass at a point above the zone of said fuel bed and passing the heated vapors and other gaseous products upwardly through and removing the same at the upper end of the pile or column, and periodically removing the lowermost portion of the fuel bed in successive layers thereof, and coincidently supplying fresh material at the top of the pile or column, thereby maintaining substantially uniform conditions of density, feed and temperature in the mass of material in any given transverse plane.

6. The process of treating carbonaceous material for the recovery of the hydrocarbon constituents thereof, which consists in igniting the base portion of a mass of material to form a fuel bed therein, periodically removing the lowermost portion of the fuel bed, and coincidently supplying fresh material to the mass to be treated, passing the heated vapors and other gaseous products from the heating zone of the fuel bed through the incoming mass of material, and removing the same, whereby the fresh material is advanced towards, into and through the fuel bed, and is subjected to gradually increasing temperature and pressure.

7. The process of treating carbonaceous material for the recovery of the hydrocarbon constituents thereof, which consists in igniting the base portion of a mass of material to form a fuel bed therein, periodically removing the lowermost portion of the fuel bed and coincidently supplying fresh material to the mass to be treated, maintaining the maximum temperature of the heating mass at a point above the zone of the fuel bed below that of the cracking point of oil, passing the heated vapors and other gaseous products from the heating zone of the fuel bed through the incoming mass of material and removing the same, whereby the fresh material is advanced towards, into and through the fuel bed and is subjected to gradually increasing temperature and pressure.

In testimony whereof I have hereunto set my hand on this 4th day of April A. D. 1918.

CHARLES C. BUSSEY.